United States Patent
Chudgar et al.

(10) Patent No.: US 9,558,012 B2
(45) Date of Patent: *Jan. 31, 2017

(54) SYSTEM BOOT WITH EXTERNAL MEDIA

(71) Applicants: Keyur Chudgar, San Jose, CA (US);
Kumar Sankaran, San Jose, CA (US)

(72) Inventors: Keyur Chudgar, San Jose, CA (US);
Kumar Sankaran, San Jose, CA (US)

(73) Assignee: APPLIED MICRO CIRCUITS CORPORATION, Santa Clara, CA (US)

(*) Notice: Subject to any disclaimer, the term of this patent is extended or adjusted under 35 U.S.C. 154(b) by 260 days.

This patent is subject to a terminal disclaimer.

(21) Appl. No.: 13/772,498

(22) Filed: Feb. 21, 2013

(65) Prior Publication Data

US 2014/0237223 A1 Aug. 21, 2014

(51) Int. Cl.
*G06F 9/00* (2006.01)
*G06F 15/177* (2006.01)
*G06F 9/44* (2006.01)

(52) U.S. Cl.
CPC .......... *G06F 9/4408* (2013.01); *G06F 9/4401* (2013.01); *G06F 9/4406* (2013.01); *G06F 9/4416* (2013.01)

(58) Field of Classification Search
CPC ..... G06F 9/4401; G06F 9/4406; G06F 9/4416
See application file for complete search history.

(56) References Cited

U.S. PATENT DOCUMENTS

| | | | |
|---|---|---|---|
| 6,154,837 A * | 11/2000 | Fudeyasu | G06F 9/4812 713/2 |
| 7,555,678 B2 * | 6/2009 | Lai et al. | 714/36 |
| 2004/0250057 A1 * | 12/2004 | Fujita et al. | 713/1 |
| 2006/0085629 A1 * | 4/2006 | Swanson | G06F 3/0623 713/1 |
| 2007/0113067 A1 * | 5/2007 | Oh | G06F 8/65 713/2 |
| 2007/0226548 A1 * | 9/2007 | Lai | G06F 9/4403 714/52 |
| 2007/0277027 A1 * | 11/2007 | Kim et al. | 713/1 |
| 2008/0271163 A1 * | 10/2008 | Stillerman et al. | 726/30 |
| 2009/0172380 A1 * | 7/2009 | Cumming | 713/2 |
| 2009/0193244 A1 * | 7/2009 | Oigawa et al. | 713/2 |

* cited by examiner

*Primary Examiner* — Mohammed Rehman
*Assistant Examiner* — Gayathri Sampath
(74) *Attorney, Agent, or Firm* — Amin, Turocy & Watson LLP (57) ABSTRACT

Various aspects of the present disclosure provide for a system that is able to boot from a variety of media that can be connected to the system, including SPI NOR and SPI NAND memory, universal serial bus ("USB") devices, and devices attached via PCIe and Ethernet interfaces. When the system is powered on, the system processor is held in a reset mode, while a microcontroller in the system identifies an external device to be booted, and then copies a portion of boot code from the external device to an on-chip memory. The microcontroller can then direct the reset vector to the boot code in the on-chip memory and brings the system processor out of reset. The system processor can execute the boot code in-place on the on-chip memory, which initiates the system memory and the second stage boot loader.

19 Claims, 11 Drawing Sheets

SYSTEM BOOT WITH EXTERNAL MEDIA

TECHNICAL FIELD

The subject disclosure relates generally to booting from external media in a system on a chip environment.

BACKGROUND

In computing, booting up is the initial set of operations that a computer system performs when electrical power to the central processing unit ("CPU") is switched on. The process begins when a computer is turned on for the first time or is re-energized after being turned off, and ends when the computer is ready to perform its normal operations. The boot procedures can include performing diagnostic tests (such as the power-on self-test), locating and initializing peripheral devices, and then finding, loading and starting an operating system ("OS").

The first stage of the boot process is a program that is executed in-place at the address that the system processor is mapped to at start up. This address is known as the reset vector. The boot code contained in the program sets up the system memory. The boot code depends on the components used on the individual boards and cannot be generalized enough so that the proper sequence could be embedded into the processor hardware. The boot code then loads the second stage boot loader or the OS kernel into the system memory.

Typically, for a system processor to execute the program in-place in the memory, the memory must be connected to the system processor via a parallel bus which allows execution in-place. Today's embedded products are real-estate sensitive however, and any parallel interface connected to the system processor greatly increases the amount of space dedicated to wiring. At the same time, embedded systems need to be able to boot from external devices that connect over a serial peripheral interface ("SPI"). Since serial interface devices do not have in-place execution capability, the system processor's reset vector cannot be mapped to the location in the external device's memory.

The above-described description is merely intended to provide a contextual overview of current techniques for booting embedded systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a system processor configured for booting off an external device and a memory configured for facilitating an environment for the system processor to execute boot code, wherein the memory is communicably coupled to the system processor. The system also comprises a microcontroller that is configured for copying the boot code from the external device to the memory and is further configured for mapping a reset vector of the system to the boot code in the memory.

In another example embodiment, a method comprises determining an external device to boot off of and copying a boot code from the external device to a first memory that is communicably coupled to a system processor. The method also comprises mapping a reset vector of the system processor to the boot code in the first memory and executing the boot code in-place in the first memory.

In an example embodiment, a system includes a means for determining an external device to boot off of and a means for copying a boot code from the external device to a memory. The system also includes a means for redirecting a reset vector of the system processor to the boot code in the memory. The system additionally includes a means for initializing the system processor with the boot code.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

BRIEF DESCRIPTION OF THE DRAWINGS

FIG. 6 illustrates a flow diagram of an example, non-limiting embodiment of a means for determining an external device to boot off of.

DETAILED DESCRIPTION

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide for a system that is able to boot from a variety of media that can be connected to the system, including SPI NOR and SPI NAND memory, universal serial bus ("USB") devices, and devices attached via PCIe and Ethernet interfaces. The system includes a microcontroller that has its own instruction and data memory on the microcontroller chip.

When the system is powered on, the microcontroller starts running a program stored in its memory while the main system processor(s) are held in reset. The microcontroller can identify the external boot devices to be booted, and then copy a portion of boot code from the external device to an on-chip memory. The microcontroller can then direct the reset vector to the boot code in the on-chip memory and bring the system processor(s) out of reset. The system processor(s) executes the boot code in-place on the on-chip memory, which initiates the system memory and the second stage boot loader.

Figure 1:
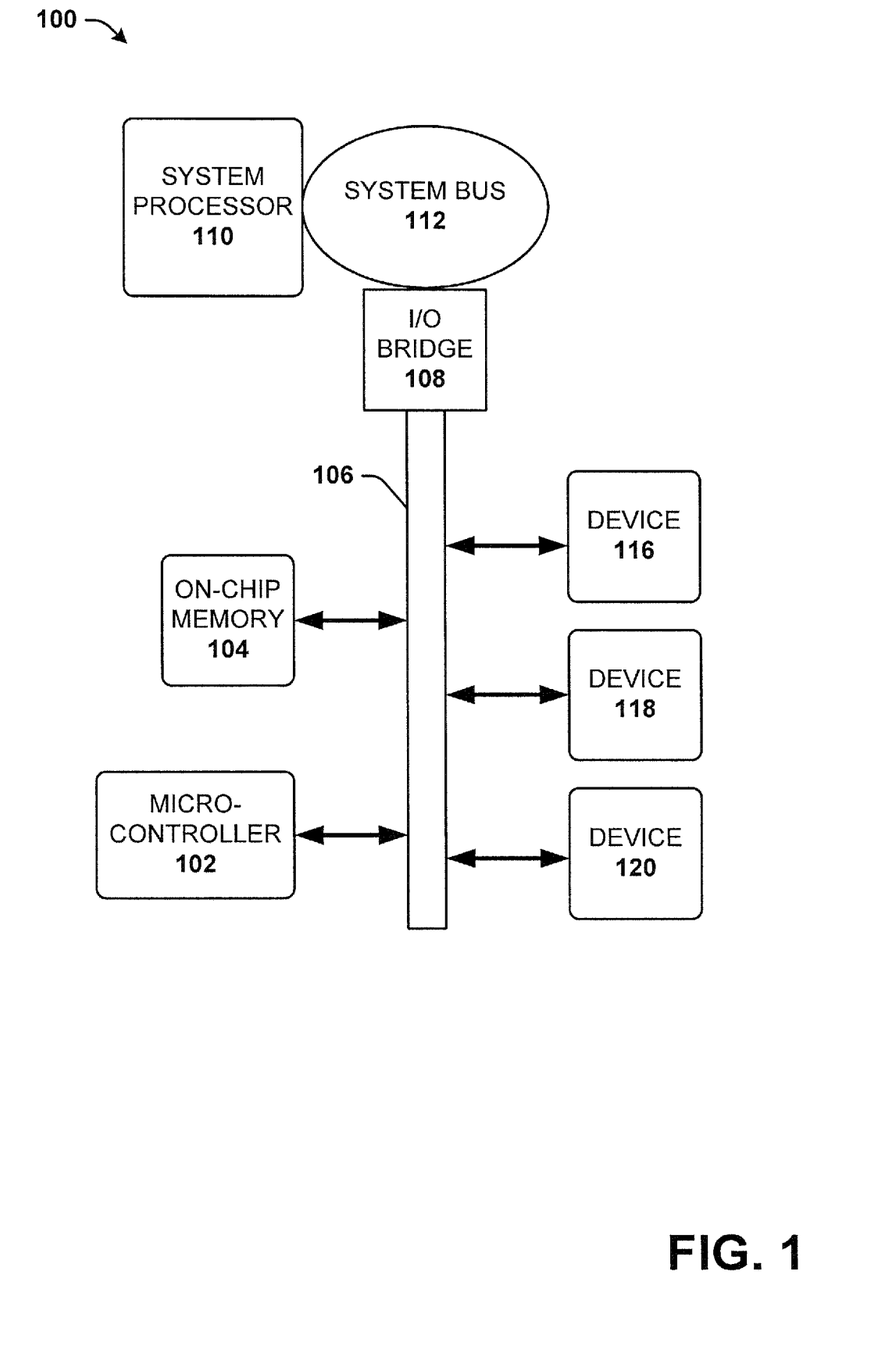
FIG. 1 is a block diagram illustrating an example, non-limiting embodiment of a system to facilitate booting off an external device in accordance with various aspects described herein.

Turning now to FIG. 1, a block diagram illustrating an example, non-limiting embodiment of a system to facilitate booting off an external device in accordance with various aspects described herein is shown. System 100 includes an input/output ("I/O") bus 106 that is communicably coupled to a microcontroller 102, an on-chip memory 104, external devices 116, 118, and 120 as well as an I/O bridge 108, system bus 112 and system processor 110.

In some embodiments, system 100 can be a system on a chip, and the microcontroller 102, on-chip memory 104, and system processor 110 can be different components within the chip. System 100 can also form an integrated circuit board in some embodiments. In some embodiments, microcontroller 102 is an ARM-based small CPU that has its own instruction and data memory. In an embodiment, the on-chip memory 104 is parallel memory that allows in-place execution of programs loaded onto it.

In an embodiment, when system 100 is powered on or reset, microcontroller 102 is the first active component in system 100. Microcontroller 102 determines which external device (116, 118, and/or 120) is to be booted from and can read the first 32 KB of data, stored in a memory on the external device, which is a boot program for the system processor 110. The microcontroller 102 can copy the boot program from the external device to the on-chip memory 104.

The system processor 110 has a reset vector which is the first address the system processor 110 will look to find the first instruction the system processor 110 will execute after being brought out of reset mode. After the microcontroller 102 copies the boot program from the external device, the microcontroller 102 will map the reset vector to the boot program, i.e., the microcontroller 102 directs to the boot program the address to which the reset is pointed. Thus, when the system processor 110 is brought out of reset, the system processor 110 will look first to the on-chip memory 104 to start executing in-place the boot program. In this way, it is possible for the system processor 110 to do in-place execution of the boot code, even when the boot program was located and stored in one of external devices 116, 118, and/or 120.

The microcontroller 102 selects the external device to boot from the set of external devices 116, 118, and 120. It is to be appreciated that while FIG. 1 displays three external devices, in other embodiments there may be a fewer or a greater number of external devices attached. Microcontroller 102 can identify the type of external device, and determine whether the system processor 110 will boot from the device. Microcontroller 102 can determine whether to boot from an external device by receiving information associated with a pinstrap configuration and analyzing the information. In some embodiments, the information can identify whether the external device has been listed as a master or slave device, the boot priority associated with the external device, and what type of device the external device is.

By way of example, microcontroller 102 can determine that external device 116 is a SPI NOR device, external device 118 is a device connected via Ethernet, and external device 120 is a USB device. Microcontroller 102 can also determine that the device with the highest boot priority is 116 and the device with the lowest boot priority is 120. Thus, microcontroller 102 will facilitate the booting of the system processor 110 from external device 116. If external device 116 is disconnected before the next reset, microcontroller 102 will facilitate the booting of the system processor 110 from external device 118, and so on.

Figure 2:
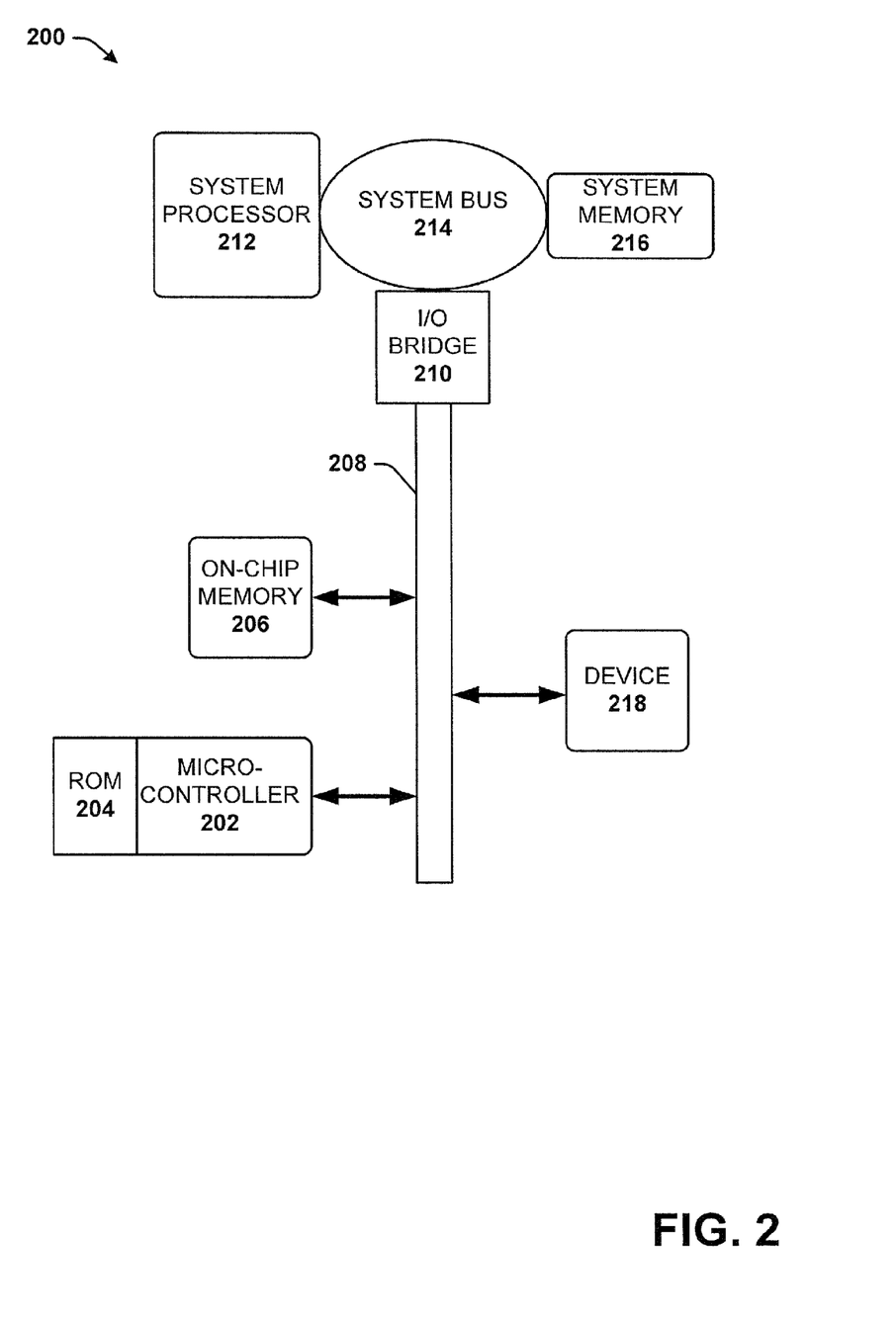
FIG. 2 is a block diagram illustrating an example, non-limiting embodiment of a system to facilitate booting off an external device in accordance with various aspects described herein.

Turning now to FIG. 2, a block diagram illustrating an example, non-limiting embodiment of a system to facilitate booting off an external device in accordance with various aspects described herein is shown. System 200 includes an I/O bus 208 that is communicably coupled to a microcontroller 202, an on-chip memory 206, an external device 218 as well as an I/O bridge 210, system bus 214, system processor 212 and system memory 216.

In an embodiment, microcontroller 202 can have its own instruction and data memory on-chip in the form of read only memory ("ROM") 204. ROM 204 can include software that stores computer-executable instructions for carrying out the operations that the microcontroller 202 performs. ROM 204 can also include device drivers for a variety of different device types that may be coupled to system 200. The device drivers stored in ROM 204 can allow microcontroller 202 access to external device 218 and enable the first stage boot program to be copied to the on-chip memory 206 and executed in-place as well as facilitating the transfer of the second stage boot loader or the OS from external device 218 to the system memory 216.

When the system 200 is powered on or reset, microcontroller 202 starts to execute instructions stored in ROM 204 to scan for external devices (e.g., 218) from which to boot the system 200. Microcontroller 202 can determine the type of device that external device 218 is, and utilize the appropriate drivers from ROM 204 to scan a memory on external device 218 for boot code. Once the boot code is found, microcontroller 202 can copy the boot code (in some embodiments, the boot code is the first 32 KB of data) to the on-chip memory 206. In some embodiments, the boot code is a boot program for the system processor 212, that instructs the system 200 how to access and load the operating system stored in external device 218.

The system processor 212 has a reset vector which is the first address the system processor 212 looks to find the first instruction the system processor 212 executes after being brought out of reset mode. After the microcontroller 202 copies the boot program from the external device 218, the microcontroller 202 maps the reset vector to the boot program, i.e., the microcontroller 202 directs to the boot program the address to which the reset is pointed. Thus, when the system processor 212 is brought out of reset, the system processor 212 looks first to the on-chip memory 206 to start executing in-place the boot program. In this way, it is possible for the system processor 212 to do in-place execution of the boot code, even when the boot program is located and stored in external device 218.

In some embodiments, (discussed in more detail with regard to FIG. 4), microcontroller 202 can facilitate running diagnostic tests on the system 200 before bringing the system processor 212 out of reset.

When the system processor 212 executes the boot code in-place in on-chip memory 206, the instructions in the boot code can direct the system processor 212 to initialize system memory 216. System memory 216 can be random access memory ("RAM"). With the system memory 216 initialized, system processor 212 can instruct the microcontroller 202 to copy the second stage boot code and/or OS from the external device 218 to the system memory 216.

Figure 3:
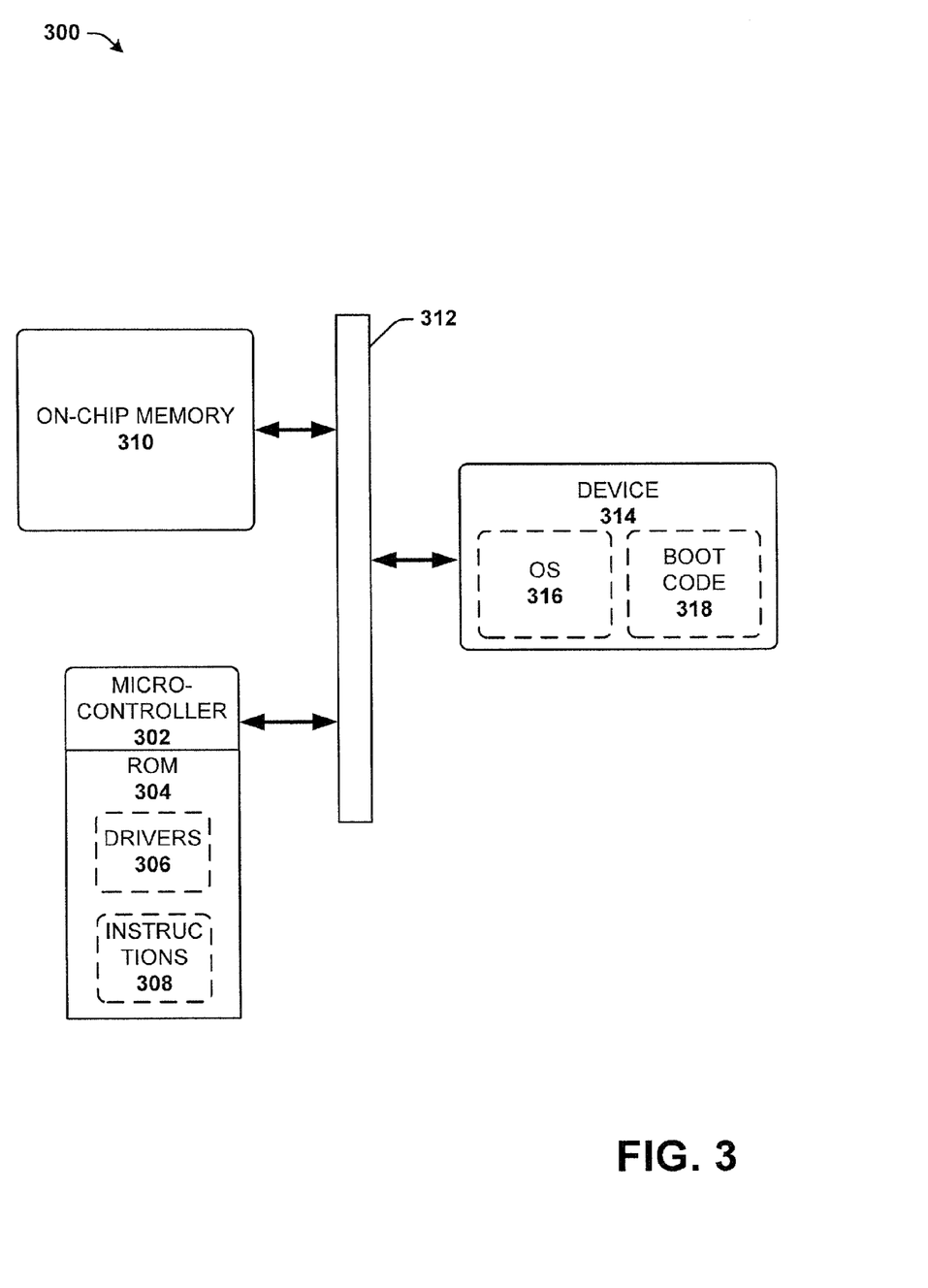
FIG. 3 is a block diagram illustrating an example, non-limiting embodiment of a system to copy boot code from an external device in accordance with various aspects described herein.

Turning now to FIG. 3, a block diagram illustrating an example, non-limiting embodiment of a system to copy boot code from an external device in accordance with various aspects described herein is shown. System 300 includes an I/O bus 308 that is communicably coupled to a microcontroller 302, an on-chip memory 306, an external device 310.

FIG. 3 shows in more detail the process described above in FIG. 2, where microcontroller 302 scans for the boot code in device 314 and copies the code to on-chip memory 310. When the When the system 300 is powered on or reset, microcontroller 302 starts to execute instructions 308 stored in ROM 304 to scan for external devices (e.g., 314) from which to boot the system 300. Microcontroller 302 can determine the type of device that external device 314 is, and can select an appropriate driver from set of drivers 306 stored in the ROM 304 to scan a memory on external device 314 for boot code 318. Once the boot code is found, microcontroller 302 can copy the boot code 318 (in some embodiments, the boot code 318 is the first 32 KB of data) to the on-chip memory 310. In some embodiments, the boot code is a boot program for the system processor (e.g., system processor 110), that instructs the system 300 how to access and load the operating system stored in external device 314.

The system processor executes the boot code 318 in-place in the on-chip memory 310 and initializes the system memory. Once the system memory is initialized, the system processor can instruct the microcontroller 302 to copy the OS 316 to the system memory where it remains for the remainder of the booting up procedure.

Figure 4:
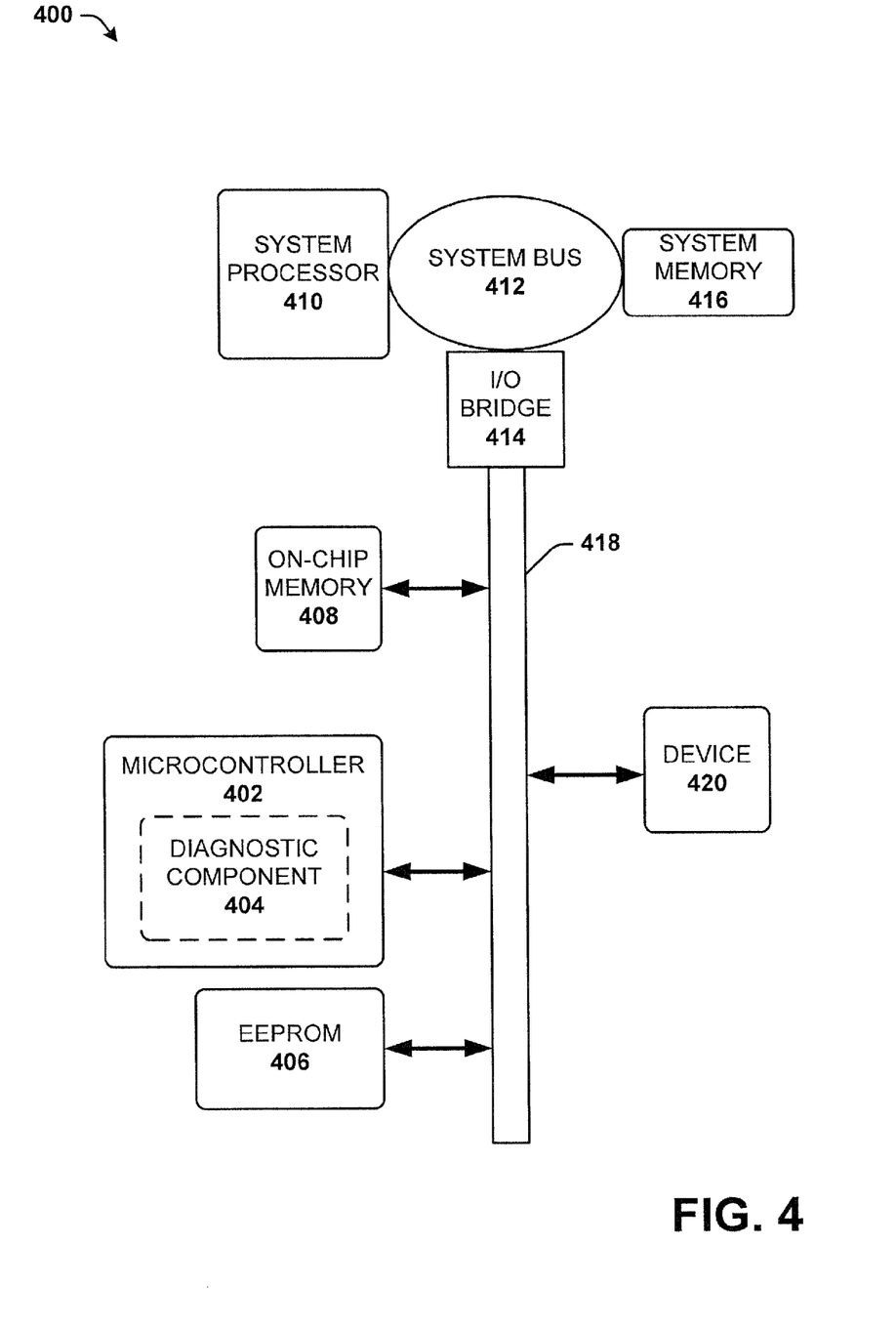
FIG. 4 is a block diagram illustrating an example, non-limiting embodiment of a system to perform diagnostic tests in accordance with various aspects described herein.

Turning now to FIG. 4, a block diagram illustrating an example, non-limiting embodiment of a system to perform diagnostic tests in accordance with various aspects described herein is shown. System 400 includes an I/O bus 418 that is communicably coupled to a microcontroller 402, an on-chip memory 408, an electrically erasable programmable ROM ("EEPROM") 406, an external device 420 as well as an I/O bridge 414, system bus 412, system processor 410 and system memory 416. Microcontroller 402 can also include a diagnostic component 404 to facilitate performing diagnostic checks on system components in system 400.

In some embodiments, diagnostic and verification tests can be performed before system processor 410 is brought out of reset mode and after microcontroller 402 has remapped the reset vector and copied the boot code from the device 420 to the on-chip memory 408. In other embodiments, the diagnostic and verification tests can be performed before the microcontroller 402 has remapped the reset vector and/or copied the boot code from the device 420 to the on-chip memory 408.

External EEPROM 406 can be connected to the microcontroller 402 through an inter-integrated circuit ("I²C") interface that is also known as a two-wire interface, and is used to connected peripherals to the embedded system. EEPROM 406 can contain code that is used to facilitate diagnostic checks of the system components in system 400. Microcontroller 402 can copy the code over to its own memory (e.g., ROM 204 and/or 304), and diagnostic component 404 can perform the diagnostic tests and verification/authentication checks. The diagnostic component 404 can check to ensure the system processor 410, system bus 412, system memory 416, I/O bridge 414, I/O bus 418, and on-chip memory 408 are functioning normally. In some embodiments, diagnostic component 404 can also verify and authenticate the system processor 410 image from the external device 420 before the system processor 410 is taken out of reset.

In view of the example systems described above, methods that may be implemented in accordance with the described subject matter may be better appreciated with reference to the flow charts of FIGS. 5-9. While for purposes of simplicity, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 5:
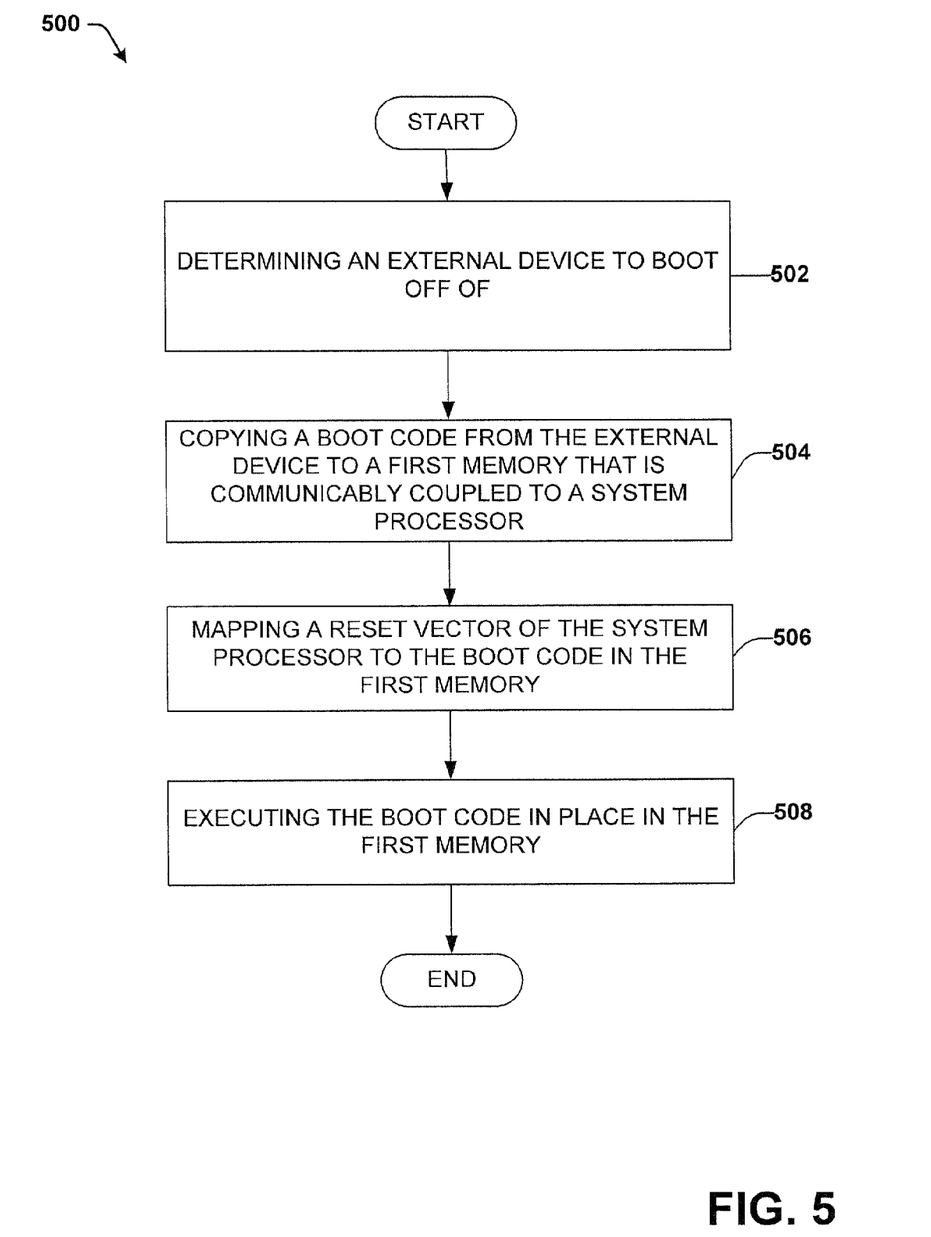
FIG. 5 illustrates a flow diagram of an example, non-limiting embodiment of a method for booting off an external device.

Referring now to FIG. 5, a flow diagram of an example, non-limiting embodiment of a method for booting off an external device is shown. Method 500 can begin at block 502, where a determination is made about which external device to boot off of. A microcontroller (e.g., 102) can scan for external devices connected via a serial peripheral interface. The microcontroller can identify the types of external devices attached and determine whether the system processor (e.g., 110) will boot from the device. Microcontroller can determine whether to boot from an external device by receiving information associated with a pinstrap configuration and analyzing the information. In some embodiments, the information can identify whether the external device has been listed as a master or slave device, the boot priority associated with the external device, and what type of device the external device is At block 504, boot code is copied from the external drive to a first memory (e.g., on-chip memory 104) that is communicably coupled to a system processor. Once the microcontroller determines the type of device the external device is, the microcontroller can select an appropriate device driver from a set of device drivers stored in a memory on the microcontroller. The device driver facilitates the scanning of the external drive by the microcontroller. Once boot code is found, the microcontroller can copy the boot code (in some embodiments 32 KB in size) to the first memory on the embedded system. The boot code can have any suitable size, however. In some embodiments, the boot code is a boot program for the system processor that instructs the system processor how to access and load the operating system stored in the external device.

At block 506, a reset vector of the system processor is mapped to the boot code in the first memory. The system processor's reset vector is the first address the system processor will look to find the first set of instructions that the system processor executes upon exiting a reset mode. After the microcontroller copies the boot program from the external device, the microcontroller will map the reset vector to the boot program. Therefore, the location the system processor looks for its first set of instructions corresponds to the boot code copied from the external device on the first memory. At 508, the boot code is executed in-place in the first memory by the system processor.

Figure 6:
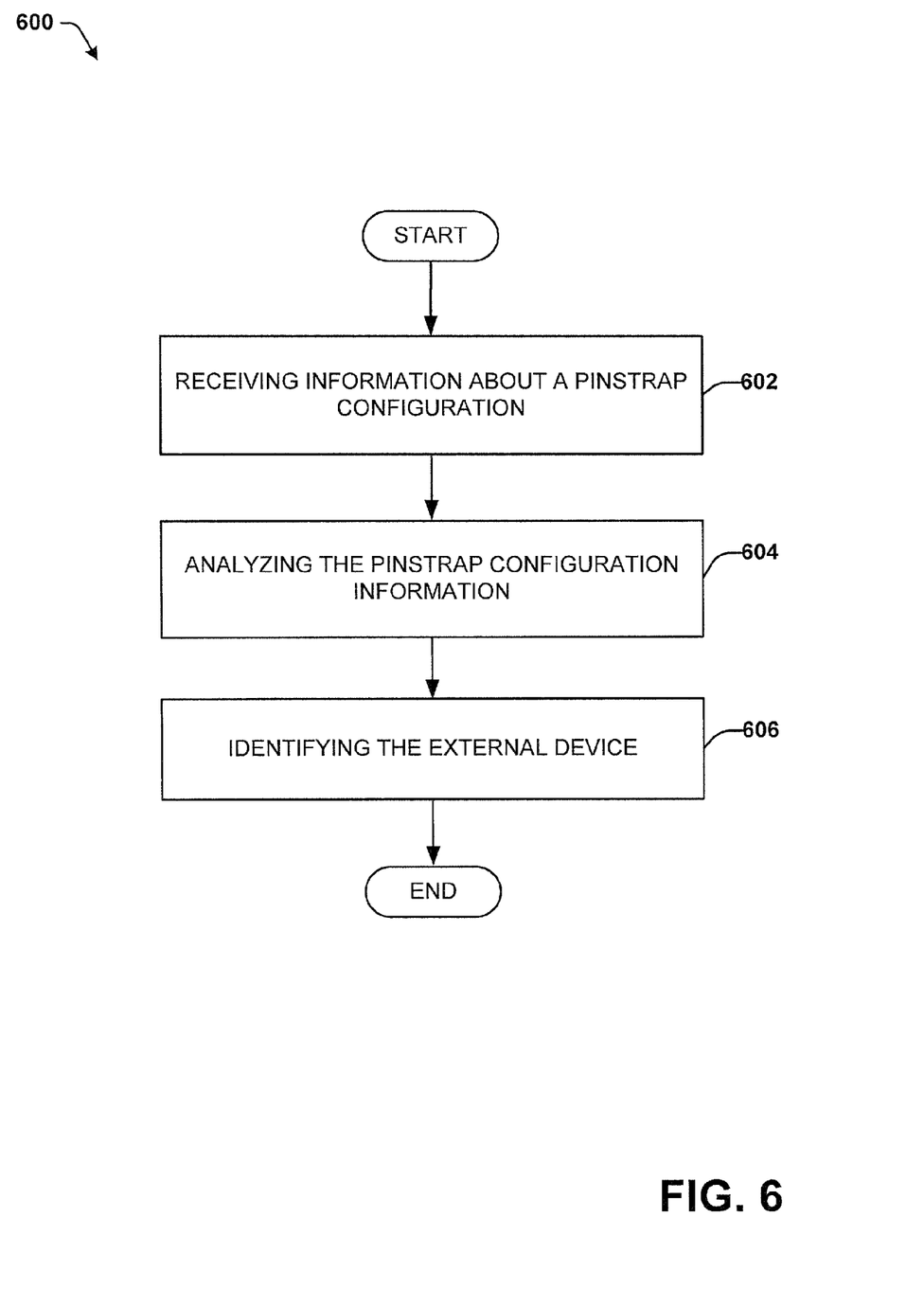

FIG. 6 illustrates a flow diagram of an example, non-limiting embodiment of a means for determining an external device to boot off of.

At 602, information is received about a pinstrap configuration. The information can identify the type of device that is attached, such as whether it is a SPI NOR device, a SPI NAND device, a USB device, and etc. The information can also indicate what priority level the device has to boot the system.

At 604, the information associated with the pinstrap configuration is analyzed, and at 606 the external device is identified. A determination about whether or not to boot the system from the device can be made based on the identity and priority information.

Figure 7:
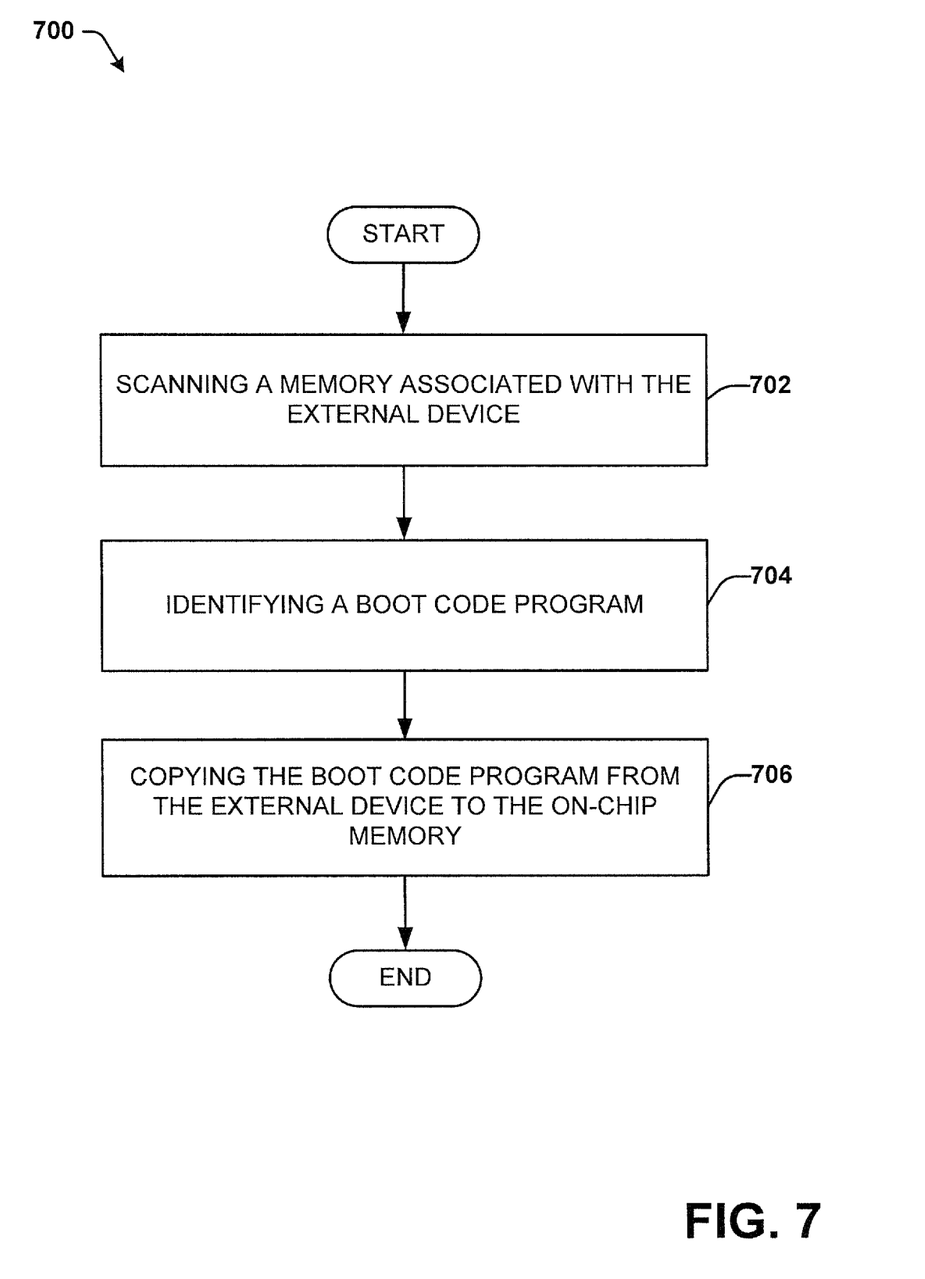
FIG. 7 illustrates a flow diagram of an example, non-limiting embodiment of a means for copying boot code from an external device to a memory.

FIG. 7 illustrates a flow diagram of an example, non-limiting embodiment of a means for copying boot code from an external device to a memory.

At 702, a memory associated with the external device is scanned. The scanning can be performed by a microcontroller (e.g., microcontroller 102, 202, 302, and/or 402). Drivers stored in the microcontroller memory can facilitate the scanning of the external device memory.

At 704, a boot code program can be identified. The microcontroller, when scanning the memory of the external device can identify programs that can be used to facilitate the boot up of the system. Different programs, or portions of code, on the external device can facilitate different segments of the boot up procedure. First stage boot loaders initialize the system processor and/or memory, whilst second stage boot loaders facilitate the loading of the operating system.

At 706, the boot code program is copied from the external device to the on-chip memory. The microcontroller copies over the first stage boot loader (in some embodiments, 32 KB) to the on-chip memory in order to facilitate the initialization of the system processor and the system memory.

Figure 8:
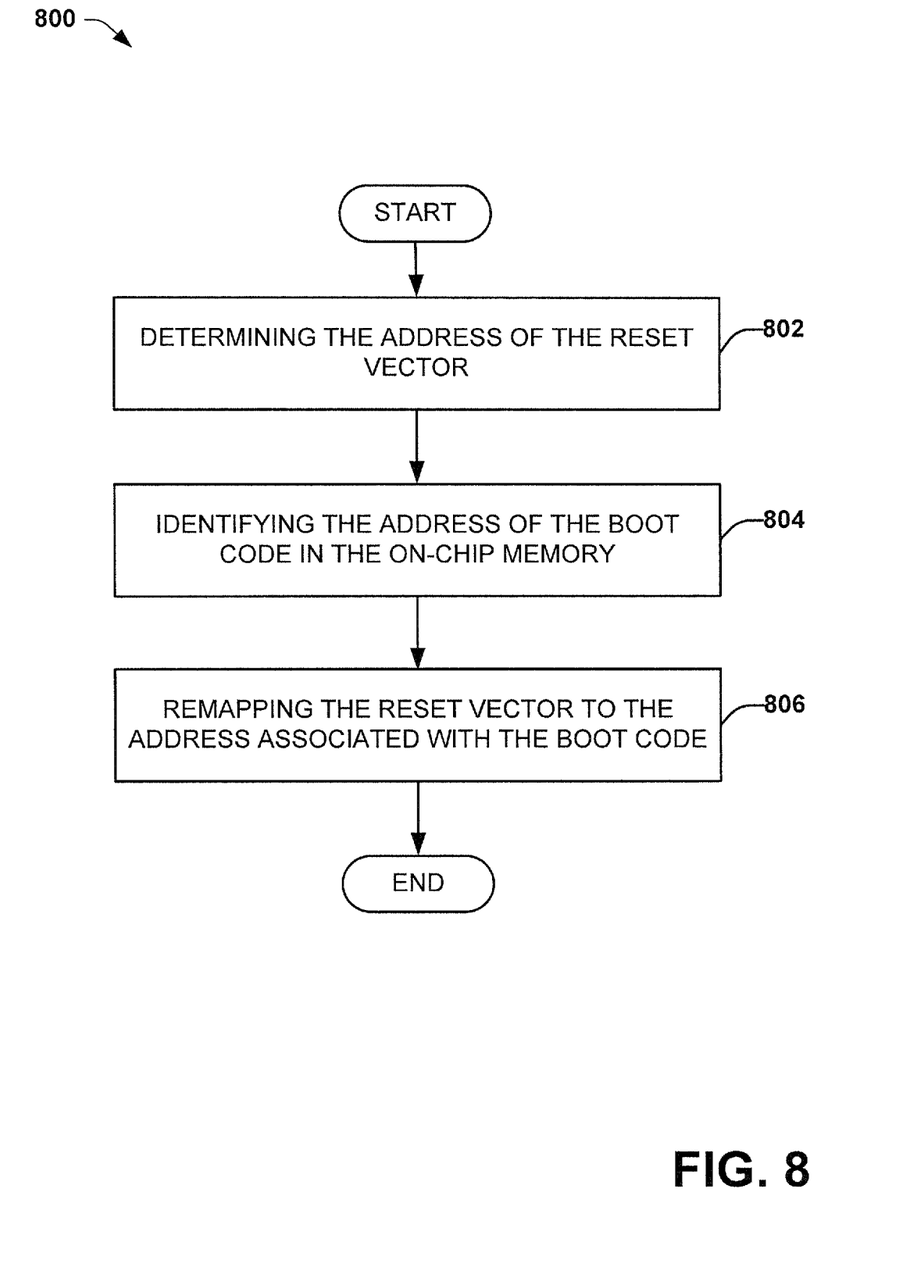
FIG. 8 illustrates a flow diagram of an example, non-limiting embodiment of a means for redirecting a reset vector of a system processor to the boot code in a memory.

FIG. 8 illustrates a flow diagram of an example, non-limiting embodiment of a means for redirecting a reset vector of a system processor to the boot code in a memory.

At 802, an address of the reset vector is determined. In some embodiments, the reset vector is set to a standard address, depending on the type of system processor. Determining the processor type can then indicate what address the reset vector is set to. Once the address of the reset vector is determined, at 804 the address of the boot code in the on-chip memory is determined. Since the microcontroller wrote the boot code to the on-chip memory, the microcontroller is able to determine the address of the boot code.

At 806, the reset vector is remapped to the address associated with the boot code. The microcontroller remaps the reset vector to the boot code, and then when the system processor looks for its first instructions, the reset vector address corresponds, via a translation, to the address of the boot code.

Figure 9:
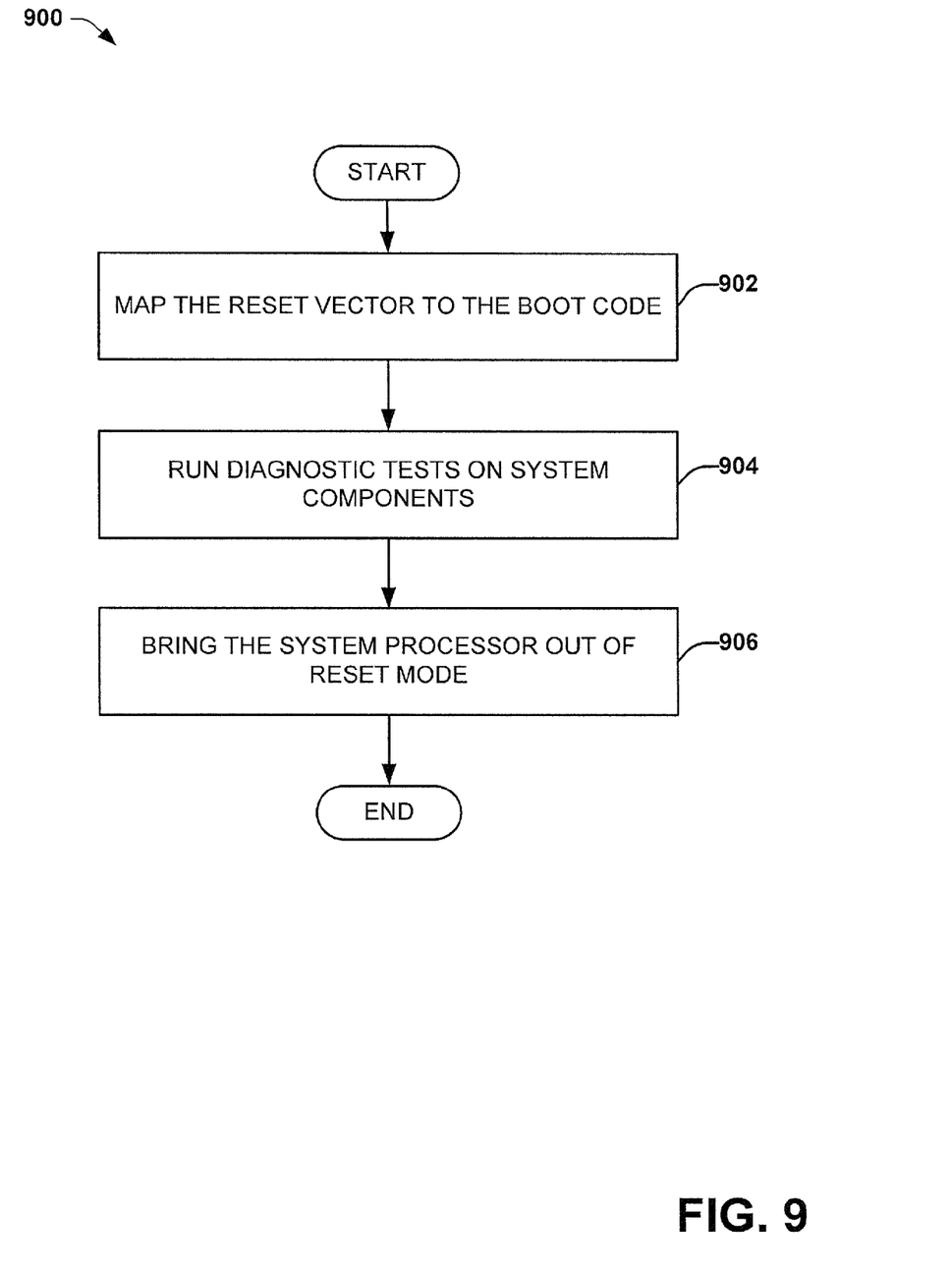
FIG. 9 illustrates a flow diagram of an example, non-limiting embodiment of a means for initializing a system processor with boot code.

At FIG. 9, a flow diagram of an example, non-limiting embodiment of a means for initializing a system processor with boot code is shown. At 902, the reset vector is remapped to the boot code, and at 904 diagnostic tests on system components are run. The diagnostic tests can be run by a diagnostic component on the microcontroller. In some embodiments, the diagnostic components can use diagnostic programs from an attached EEPROM memory device coupled to the microcontroller. Once the system is determined to be running normally, or at least to acceptable specifications, the microcontroller, at 906 can bring the system processor out of reset mode.

Example Computing Environment

Figure 10:
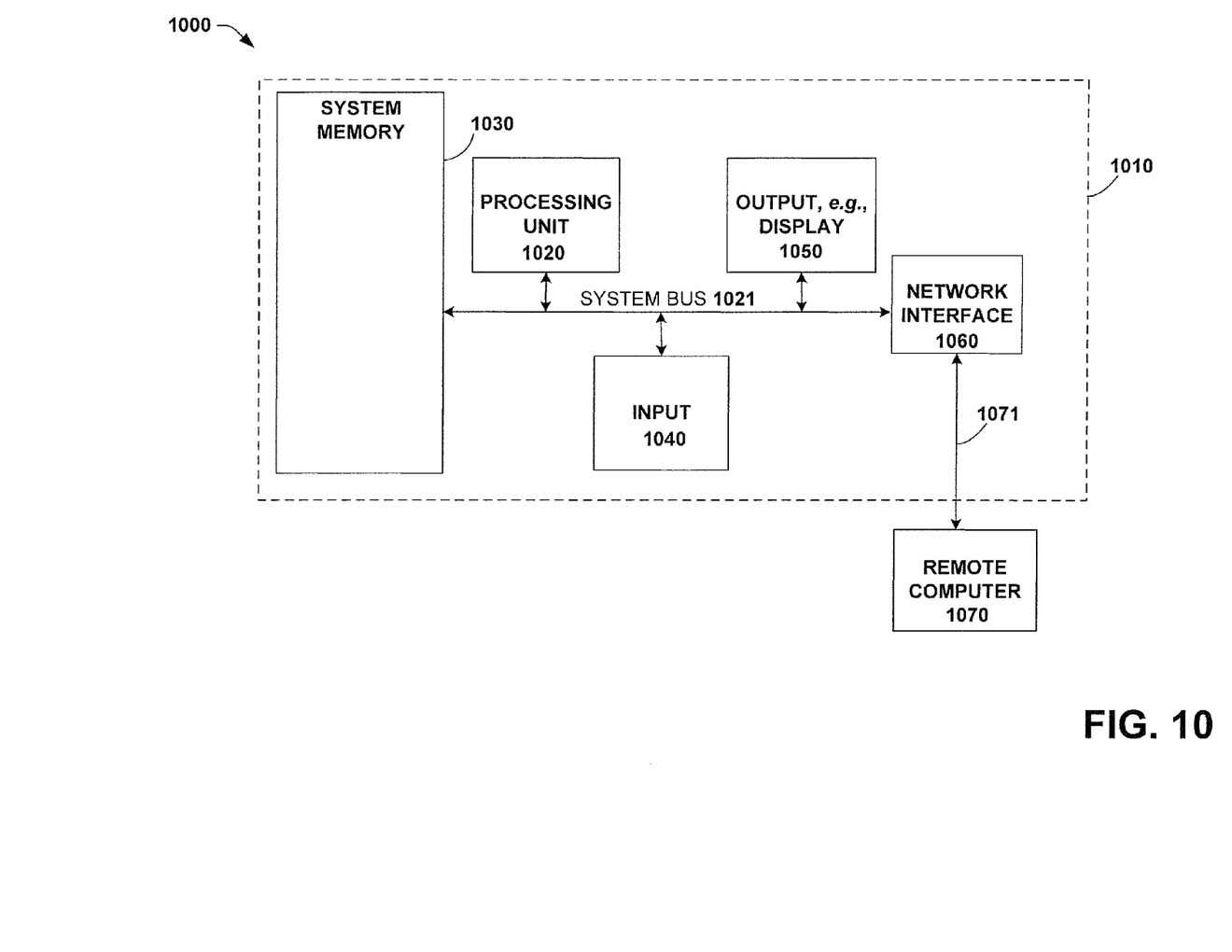
FIG. 10 illustrates a block diagram of an example electronic computing environment that can be implemented in conjunction with one or more aspects described herein.

As mentioned, advantageously, the techniques described herein can be applied to any device where it is desirable to facilitate booting off of external media. It is to be understood, therefore, that handheld, portable and other computing devices and computing objects of all kinds are contemplated for use in connection with the various non-limiting embodiments, i.e., anywhere that a device may wish to share computing resources with a plurality of guest devices or virtual machines. Accordingly, the below general purpose remote computer described below in FIG. 10 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 10 thus illustrates an example of a suitable computing system environment 1000 in which some aspects of the disclosed subject matter can be implemented, although as made clear above, the computing system environment 1000 is only one example of a suitable computing environment for a device and is not intended to suggest any limitation as to the scope of use or functionality of the disclosed subject matter. Neither should the computing environment 1000 be interpreted as having any dependency or requirement relating to any one or combination of components illustrated in the exemplary operating environment 1000.

With reference to FIG. 10, an exemplary device for implementing the disclosed subject matter includes a general-purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures.

Computer 1010 typically includes a variety of computer readable media. Computer readable media can be any available media that can be accessed by computer 1010. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media typically embodies computer readable instructions, data structures, program modules, or other data in a modulated data signal such as a carrier wave or other transport mechanism and includes any information delivery media.

The system memory 1030 may include computer storage media in the form of volatile and/or nonvolatile memory such as read only memory (ROM) and/or random access memory (RAM). A basic input/output system (BIOS), containing the basic routines that help to transfer information between elements within computer 1010, such as during start-up, may be stored in memory 1030. Memory 1030 typically also contains data and/or program modules that are immediately accessible to and/or presently being operated on by processing unit 1020. By way of example, and not limitation, memory 1030 may also include an operating system, application programs, other program modules, and program data.

The computer 1010 may also include other removable/non-removable, volatile/nonvolatile computer storage media. For example, computer 1010 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1021 through a non-removable memory interface such as an interface, and a magnetic disk drive or optical disk drive is typically connected to the system bus 1021 by a removable memory interface, such as an interface.

A user can enter commands and information into the computer 1010 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1020 through user input 1040 and associated interface(s) that are coupled to the system bus 1021, but may be connected by other interface and bus structures, such as a parallel port, game port, or a universal serial bus (USB). A graphics subsystem can also be connected to the system bus 1021. A projection unit in a projection display device, or a HUD in a viewing device or other type of display device can also be connected to the system bus 1021 via an interface, such as output interface 1050, which may in turn communicate with video memory. In addition to a monitor, computers can also include other peripheral output devices such as speakers which can be connected through output interface 1050.

The computer 1010 can operate in a networked or distributed environment using logical connections to one or more other remote computer(s), such as remote computer 1070, which can in turn have media capabilities different from device 1010. The remote computer 1070 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1010. The logical connections depicted in FIG. 10 include a network 1071, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1010 can be connected to the LAN 1071 through a network interface or adapter. When used in a WAN networking environment, the computer 1010 can typically include a communications component, such as a modem, or other means for establishing communications over the WAN, such as the Internet. A communications component, such as wireless communications component, a modem and so on, which can be internal or external, can be connected to the system bus 1021 via the user input interface of input 1040, or other appropriate mechanism. In a networked environment, program modules depicted relative to the computer 1010, or portions thereof, can be stored in a remote memory storage device. It will be appreciated that the network connections shown and described are exemplary and other means of establishing a communications link between the computers can be used.

Example Networking Environment

Figure 11:
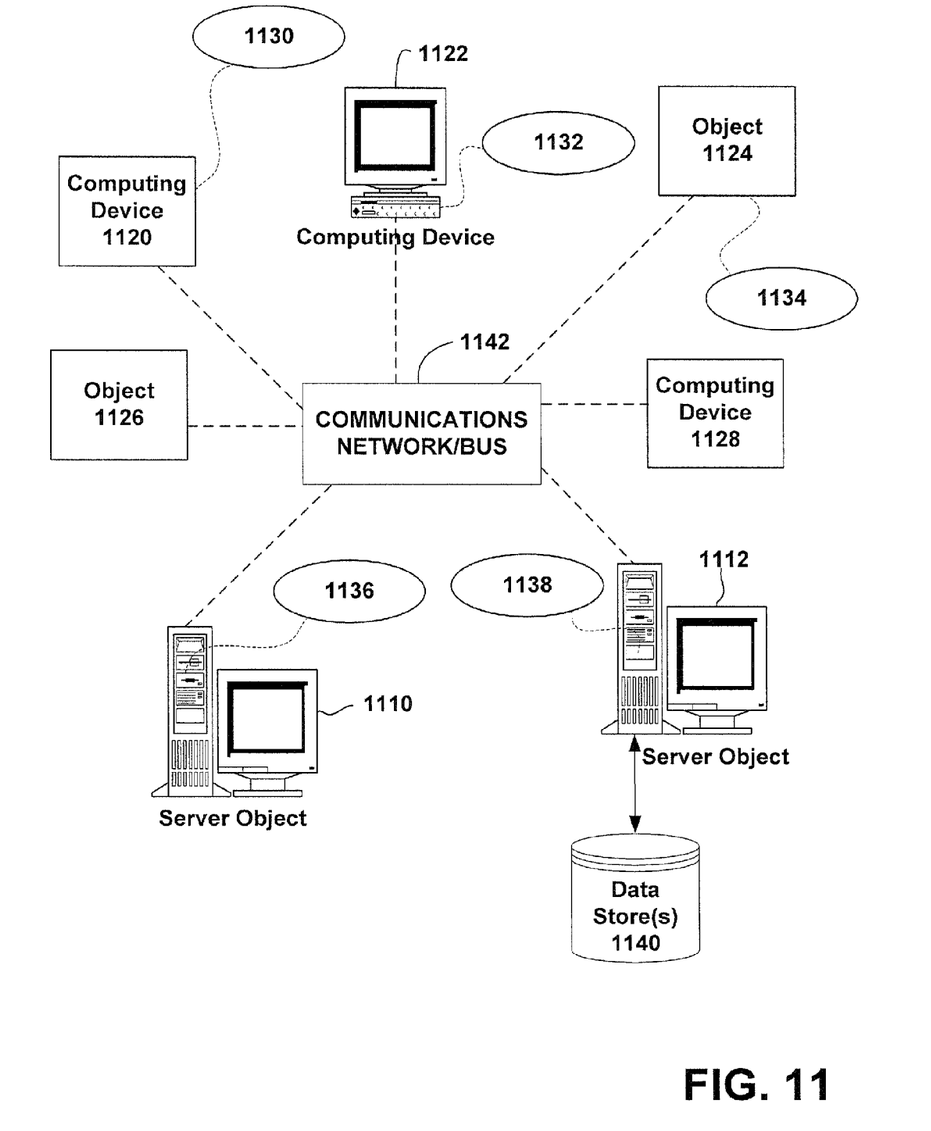
FIG. 11 illustrates a block diagram of an example data communication network that can be operable in conjunction with various aspects described herein.

FIG. 11 provides a schematic diagram of an exemplary networked or distributed computing environment. The distributed computing environment comprises computing objects 1110, 1112, etc. and computing objects or devices 1120, 1122, 1124, 1126, 1128, etc., which may include programs, methods, data stores, programmable logic, etc., as represented by applications 1130, 1132, 1134, 1136, 1138 and data store(s) 1140. It can be appreciated that computing objects 1110, 1112, etc. and computing objects or devices 1120, 1122, 1124, 1126, 1128, etc. may comprise different devices, including multimedia display device 100 or similar devices depicted within the illustrations, or other devices such as a mobile phone, personal digital assistant (PDA), audio/video device, MP3 players, personal computer, laptop, etc. It should be further appreciated that data store(s) 1140 can include data store 108, or other similar data stores disclosed herein.

Each computing object 1110, 1112, etc. and computing objects or devices 1120, 1122, 1124, 1126, 1128, etc. can communicate with one or more other computing objects 1110, 1112, etc. and computing objects or devices 1120, 1122, 1124, 1126, 1128, etc. by way of the communications network 1142, either directly or indirectly. Even though illustrated as a single element in FIG. 11, communications network 1142 may comprise other computing objects and computing devices that provide services to the system of FIG. 11, and/or may represent multiple interconnected networks, which are not shown. Each computing object 1110, 1112, etc. or computing object or devices 1120, 1122, 1124, 1126, 1128, etc. can also contain an application, such as applications 1130, 1132, 1134, 1136, 1138, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 11, as a non-limiting example, computing objects or devices 1120, 1122, 1124, 1126, 1128, etc. can be thought of as clients and computing objects 1110, 1112, etc. can be thought of as servers where computing objects 1110, 1112, etc., acting as servers provide data services, such as receiving data from client computing objects or devices 1120, 1122, 1124, 1126, 1128, etc., storing of data, processing of data, transmitting data to client computing objects or devices 1120, 1122, 1124, 1126, 1128, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1142 or bus is the Internet, for example, the computing objects 1110, 1112, etc. can be Web servers with which other computing objects or devices 1120, 1122, 1124, 1126, 1128, etc. communicate via any of a number of known protocols, such as the hypertext transfer protocol (HTTP). Computing objects 1110, 1112, etc. acting as servers may also serve as clients, e.g., computing objects or devices 1120, 1122, 1124, 1126, 1128, etc., as may be characteristic of a distributed computing environment.

Reference throughout this specification to "one embodiment," "an embodiment," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, NAND and NOR memory refer to two types of flash memory based on the NAND and NOR logic gates that they respectively use. The NAND type is primarily used in main memory memory cards, USB flash drives, solid-state drives, and similar products, for general storage and transfer of data. The NOR type, which allows true random access and therefore direct code execution, is used as a replacement for the older EPROM and as an alternative to certain kinds of ROM applications. However, NOR flash memory can emulate ROM primarily at the machine code level; many digital designs need ROM (or PLA) structures for other uses, often at significantly higher speeds than (economical) flash memory may achieve. NAND or NOR flash memory is also often used to store configuration data in numerous digital products, a task previously made possible by EEPROMs or battery-powered static RAM.

As utilized herein, terms "component," "system," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

Other than where otherwise indicated, all numbers, values and/or expressions referring to quantities of items such as memory size, etc., used in the specification and claims are to be understood as modified in all instances by the term "about."

What is claimed is:

1. A system on a chip, comprising:
   a system processor configured for booting off an external device;
   a memory, provided on the chip, configured for facilitating an environment for the system processor to execute boot code, the memory communicably coupled to the system processor; and
   a microcontroller comprising a read only memory configured for storing a set of drivers and wherein the microcontroller is configured for performing operations comprising:
     copying the boot code from the external device to the memory;
     remapping a reset vector of the system processor from a first address associated with the external device to a second address of the memory that is associated with the boot code copied to the memory; and
     selecting a driver from the set of drivers in the read only memory based on the external device, wherein the system processor executes the boot code in-place in the memory using the selected driver from the read only memory in the micro-controller.

2. The system on a chip of claim 1, wherein the microcontroller is configured for identifying an external device to copy the boot code to the memory from a set of external devices, wherein the microcontroller is further configured for identifying the external device based on a pinstrap configuration.

3. The system on a chip of claim 1, wherein the system processor is held in a reset mode until the microcontroller remaps the reset vector in the memory.

4. The system on a chip of claim 1, wherein the external device is connected to an I/O bus via a serial peripheral interface.

5. The system on a chip of claim 1, wherein a size of the boot code copied to the memory is 32 kilobytes.

6. The system on a chip of claim 1, wherein the microcontroller is further configured for running a diagnostic test on a system component.

7. The system on a chip of claim 6, wherein the microcontroller is configured for bringing the system processor out of reset in response to the system component passing the diagnostic test.

8. The system on a chip of claim 1, wherein the microcontroller selects the driver from the set of drivers based on a device type to which the external device corresponds.

9. The system on a chip of claim 1, wherein the microcontroller is further configured for copying a second stage boot loader to a system memory in response to executing the boot code in-place in the memory, wherein the second stage boot loader initializes an operating system.

10. A method, comprising:
   determining an external device off of which to boot;
   copying a boot code from the external device to a first memory communicably coupled to a system processor, wherein the first memory and the system processor are on a system on a chip;
   remapping a reset vector of the system processor from a first address associated with the external device to a second address of the first memory that is associated with the boot code copied to the first memory;
   selecting a driver from a set of drivers stored in the first memory based on the external device; and
   executing the boot code in-place in the first memory based in part on the selected driver.

11. The method of claim 10, wherein determining the external device to boot off of comprises identifying an external device based on analyzing a pinstrap configuration.

12. The method of claim 10, further comprising sending a command to the system processor to come out of a reset mode in response to mapping the reset vector to the boot code.

13. The method of claim 10, further comprising copying an operating system from the external device to a system memory in response to the system processor executing the boot code.

14. The method of claim 10, further comprising accessing a read-only memory and copying a diagnostic application from the read-only memory to the first memory.

15. The method of claim 14, further comprising executing the diagnostic application and running a diagnostic test on a system component.

16. The method of claim 15, sending a command to the system processor to come out of a reset mode in response to the system component passing the diagnostic test.

17. The method of claim 15, wherein the diagnostic test comprises authenticating a system processor image from the external device.

18. The method of claim 10, wherein the selecting the driver further comprises selecting the driver based on a device type to which the external device corresponds.

19. A system, comprising:
   means for determining an external device off of which to boot;
   means for copying a boot code from the external device to an on-chip memory;
   means for remapping a reset vector of the system processor on a system on a chip from a first address associated with the external device to a second address of the on-chip memory associated with the boot code copied to the on-chip memory; and
   means for initializing the system processor with the boot code based on a driver that has been selected from a set of drivers stored in a read only memory on the system on a chip, wherein the driver corresponds to the external device.

* * * * *